(12) United States Patent
Tanaka et al.

(10) Patent No.: US 9,604,664 B2
(45) Date of Patent: Mar. 28, 2017

(54) STEERING DEVICE

(71) Applicants: JTEKT CORPORATION, Osaka-shi, Osaka (JP); TOYOTA JIDOSHA KABUSHIKI KAISHA, Toyota-shi, Aichi (JP)

(72) Inventors: Eiji Tanaka, Kitakatsuragi-gun (JP); Hiroyuki Yao, Okazaki-shi (JP); Shigeru Hoshino, Toyota-shi (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/891,164

(22) PCT Filed: Jun. 10, 2014

(86) PCT No.: PCT/JP2014/065279
§ 371 (c)(1),
(2) Date: Nov. 13, 2015

(87) PCT Pub. No.: WO2014/199963
PCT Pub. Date: Dec. 18, 2014

(65) Prior Publication Data
US 2016/0107677 A1    Apr. 21, 2016

(30) Foreign Application Priority Data
Jun. 11, 2013 (JP) ................ 2013-122824

(51) Int. Cl.
*B62D 1/19*    (2006.01)
(52) U.S. Cl.
CPC .................... *B62D 1/195* (2013.01)
(58) Field of Classification Search
CPC ........ B62D 1/195; B62D 1/197; B62D 1/192; B62D 1/19; B62D 1/18; Y10S 248/90
(Continued)

(56) References Cited

U.S. PATENT DOCUMENTS 5,082,311 A * 1/1992 Melotik ................ B62D 1/195
                                                    188/371
7,661,711 B2 * 2/2010 Menjak ................ B62D 1/195
                                                    280/777
(Continued)

FOREIGN PATENT DOCUMENTS

CN    102625761 A    8/2012
JP    S63-112973 U   7/1988
(Continued)

OTHER PUBLICATIONS

Sep. 5, 2016 Office Action issued in Chinese Patent Application No. 201480033279.1.
(Continued)

*Primary Examiner* — Keith Frisby
(74) *Attorney, Agent, or Firm* — Oliff PLC

(57) ABSTRACT

Column moving direction is referred to as first direction, opposite direction to the first direction is referred to as second direction, and direction which is orthogonal to the first direction is referred to as third direction. First suspending bolt is in contact with cylindrical surface which is formed by end portion of first elongated slot in second direction to thereby be positioned in relation to the second direction and the third direction. Second suspending bolt is positioned only in relation to the second direction by inner surface of end portion of second elongated slot in the second direction. Positions of portions of the end portions of the elongated slots which are situated farthest in the second direction are made equal to each other with respect to the second direction, and both the suspending bolts are aligned in position with respect to the first direction.

5 Claims, 9 Drawing Sheets

(58) Field of Classification Search
USPC .......... 280/777, 779; 74/492; 188/376, 371; 248/548, 900
See application file for complete search history.

(56) References Cited

U.S. PATENT DOCUMENTS

| | | |
|---|---|---|
| 2007/0080531 A1 | 4/2007 | Min |
| 2010/0156081 A1 | 6/2010 | Min |
| 2012/0112443 A1* | 5/2012 | Arakawa ................ B62D 1/195 |
| | | 280/777 |
| 2012/0187669 A1 | 7/2012 | Minamigata et al. |
| 2013/0133460 A1 | 5/2013 | Uesaka |
| 2015/0314802 A1 | 11/2015 | Tanaka et al. |

FOREIGN PATENT DOCUMENTS

| | | | |
|---|---|---|---|
| JP | 2009-227183 A | | 10/2009 |
| JP | 2012-121538 A | | 6/2012 |
| JP | 2013-112147 A | | 6/2013 |
| JP | 2014-166841 A | | 9/2014 |
| JP | 2014227099 A | * | 12/2014 |
| KR | 20070038724 A | | 4/2007 |

OTHER PUBLICATIONS

Sep. 16, 2014 Search Report issued in International Patent Application No. PCT/JP2014/065279.

* cited by examiner

STEERING DEVICE

TECHNICAL FIELD

The present invention relates to a steering device.

BACKGROUND ART

In a steering device, following a primary collision in which a vehicle collides with another vehicle, a secondary collision occurs in which a driver of the vehicle collides with a steering wheel thereof.

With a view to absorbing an impact associated with the secondary collision, various types of constructions have been proposed in which a portion of a steering column is dislocated from a body of a vehicle so as to be allowed to move in a column axial direction.

For example, in FIG. 9 of Patent Literature 1, a pair of locking cutouts are provided in a body side bracket which is fixed to a body of a vehicle so as to extend parallel to a column axial direction.

A column side bracket is supported via a pair of locking capsules which are held individually in the corresponding locking cutouts with pluralities of locking pins.

The locking capsules are each connected and fixed to the column side bracket via a bolt which passes through each locking cutout.

When the secondary collision occurs, the pluralities of locking pins which hold the locking capsules fracture, whereby the locking capsules are dislocated from the corresponding locking cutouts, and the bolts, the locking capsules and the column bracket move together in the column axial direction.

CITATION LIST

Patent Literature

[Patent Literature 1] JP-A-2012-121538

SUMMARY OF INVENTION

Technical Problem

However, there are cases where the positions of both the bolts are not aligned in relation to the column moving direction and the column bracket and a jacket are not oriented straight with respect to the column moving direction before the occurrence of the secondary collision.

In these cases, there are fears that prying is generated in the column bracket or the jacket when a secondary collision occurs.

Then, an object of the invention is to provide a steering device which can suppress the generation of prying when a secondary collision occurs.

Solution to Problem

With a view to achieving the object, an invention of Claim 1 comprises:

a fixed bracket which includes a first plate which is fixed to a vehicle body-side member;

a movable jacket which rotatably supports a steering shaft having a steering member connected to one end of the steering shaft;

a movable bracket which supports the movable jacket so as to move in a first direction which is a column moving direction when a secondary collision occurs and which includes a second plate facing the first plate; and a first suspending mechanism and a second suspending mechanism which move together in the first direction when the secondary collision occurs, wherein a first elongated slot and a second elongated slot are provided in the first plate so as to extend parallel to the first direction, wherein a first circular hole which corresponds to the first elongated slot and a second circular hole which corresponds to the second elongated slot are provided in the second plate, wherein the first suspending mechanism has a first suspending shaft which suspends the movable jacket via the movable bracket by passing through the first elongated slot and the first circular hole to connect the first plate and the second plate together, wherein the second suspending mechanism has a second suspending shaft which suspends the movable jacket via the movable bracket by passing through the second elongated slot and the second circular hole to connect the first plate and the second plate together, wherein the first circular hole and the second circular hole are disposed in the same position with respect to the first direction, wherein the first suspending shaft passes through an end portion of the first elongated slot in a second direction which is an opposite direction to the first direction, wherein the second suspending shaft passes through an end portion of the second elongated slot in the second direction, wherein slot widths of the first elongated slot and the second elongated slot with respect to a third direction which is orthogonal to the first direction are made greater than diameters of the first suspending shaft and the second suspending shaft, wherein an inner surface of the end portion of the first elongated slot in the second direction is formed into a cylindrical surface which is concentric with and is identical in diameter to the first suspending shaft so as to be in contact with a predetermined area of an outer circumference of the first suspending shaft to thereby restrict a position of the first suspending shaft in relation to the second direction and a position of the first suspending shaft in relation to the third direction, wherein an inner surface of the end portion of the second elongated slot in the second direction is brought into contact with only a portion of an outer circumference of the second suspending shaft which is situated farthest in the second direction to thereby restrict only a position of the second suspending shaft in relation to the second direction, and wherein a position with respect to the second direction of a portion of the end portion of the first elongated slot in the second direction which is situated farthest in the second direction is equal to a position with respect to the second direction of a portion of the end portion of the second elongated slot in the second direction which is situated farthest in the second direction.

Additionally, as claimed in Claim 2, the inner surface of the end portion of the second elongated slot in the second direction may be formed into a cylindrical surface which has a center being offset in the first direction with respect to a center of the second suspending shaft and which has a radius greater than a radius of the second suspending shaft.

Additionally, as claimed in Claim 3, the radius of the cylindrical surface formed by the inner surface of the end portion of the second elongated slot in the second direction may be equal to half the slot width of the second elongated slot in the third direction.

Additionally, as claimed in Claim 4, the inner surface of the end portion of the second elongated slot in the second direction may be formed into a flat surface which extends along the third direction.

Additionally, as claimed in Claim 5, a distance with respect to the third direction between a center of the first circular hole and a center of the second circular hole may be equal to a distance between a center of the slot width of the first elongated slot with respect to the third direction and a center of the slot width of the second elongated slot with respect to the third direction.

Advantageous Effect of Invention

According to the invention of Claim 1, the predetermined area of the outer circumference of the first suspending shaft is brought into contact with the cylindrical surface of the end portion of the first elongated slot in the second direction (the cylindrical surface which is concentric with and is identical in diameter to the first suspending shaft), whereby the first suspending shaft is positioned in the two directions (the second direction and the third direction) which are orthogonal to each other.

The second suspending shaft which is positioned only in the second direction by the inner surface of the end portion of the second elongated slot in the second direction has a degree of freedom in the third direction, and therefore, both the suspending shafts can easily be mounted based on the first elongated slot.

Moreover, the portions of the end portions of both the elongated slots in the second direction which are situated farthest in the second direction are positioned equally with respect to the second direction. Therefore, the positions of both the suspending shafts can be aligned in the first direction (the column moving direction) before a secondary collision occurs.

Consequently, when the secondary collision occurs, both the suspending shafts move straight in the column moving direction (the direction in which the elongated slots extend) together with the movable bracket and the movable jacket, and therefore, it is possible to suppress the generation of prying in the movable bracket or the movable jacket.

According to the invention of Claim 2, the second suspending shaft can easily be positioned only in the second direction by the inner surface of the end portion of the second elongated slot in the second direction which is formed into the cylindrical surface which has the center which is offset in the first direction relative to the center of the second suspending shaft and which has the radius which is greater than the radius of the second suspending shaft.

As claimed in Claim 3, the radius of the cylindrical surface which is formed by the inner surface of the end portion of the second elongated slot in the second direction is equal to half the slot width of the second elongated slot with respect to the third direction, and therefore, the end portion of the second elongated slot can be formed with good accuracy.

According to the invention of Claim 4, the second suspending shaft can easily be positioned only in the second direction by the inner surface of the end portion of the second elongated slot in the second direction which is formed into the flat surface which extends along the third direction.

According to the invention of Claim 5, the distance with respect to the third direction between the centers of both the circular holes is made equal to the distance with respect to the third direction between the centers of the slot widths of both the elongated slots, whereby the advantages that are to be provided by Claims 1 to 4 can be achieved in an ensured fashion.

Hatching on the sections of the first plate and both the suspending bolts are omitted.

Figure 10:
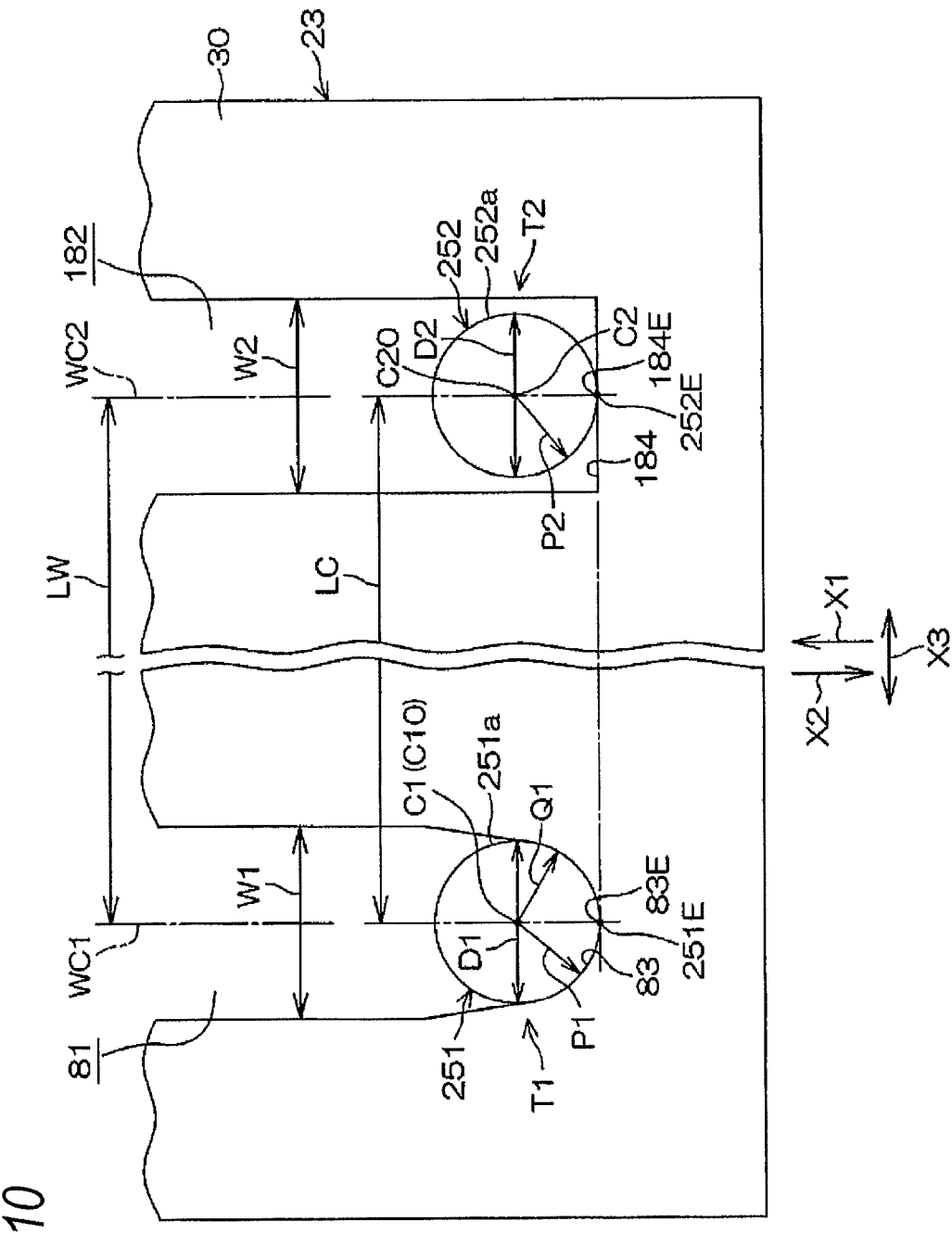

FIG. 10 is a schematic view of both elongated slots in a first plate and both suspending bolts in a second embodiment of the invention.

Hatching on the sections of the first plate and both the suspending bolts are omitted.

DESCRIPTION OF EMBODIMENT

Hereinafter, referring to the accompanying drawings, preferred embodiments of the invention will be described.

Figure 1:
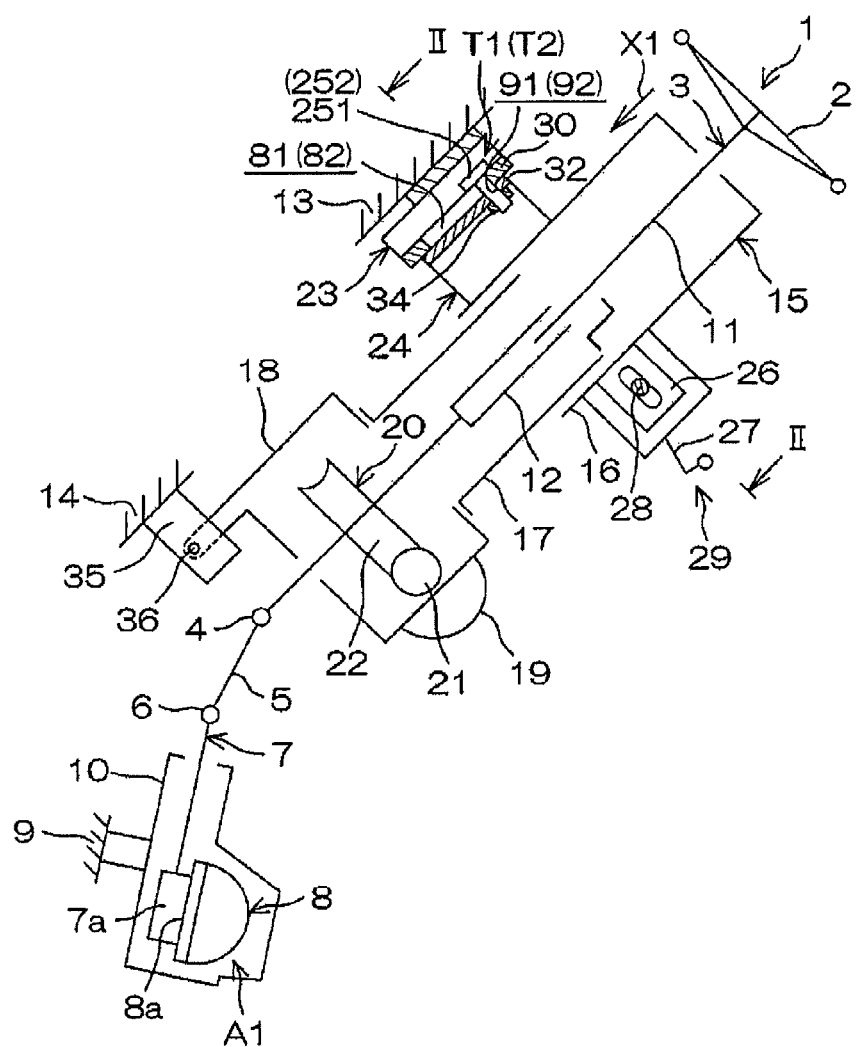
FIG. 1 is a schematic side view of a steering device of a first embodiment of the invention, which shows a schematic configuration of the steering device.

FIG. 1 is a schematic diagram showing a schematic configuration of a steering device of a first embodiment of the invention.

Referring to FIG. 1, a steering device 1 has a steering shaft 3 which is connected to a steering member 2 such as a steering wheel, an intermediate shaft 5 which is connected to the steering shaft 3 via a universal joint 4, a pinion shaft 7 which is connected to the intermediate shaft 5 via a universal joint 6, and a rack shaft 8 which has a rack 8a configured to mesh with a pinion 7a which is provided near an end portion of the pinion shaft 7 as steered shafts.

A steering mechanism A1 is made up of a rack-and-pinion mechanism which includes the pinion shaft 7 and the rack shaft 8.

The rack shaft 8 is supported by a housing 10 which is fixed to a vehicle body-side member 9 so as to move in an axial direction (a direction which is orthogonal to a surface of a sheet of paper on which FIG. 1 is drawn) which follows a left-to-right direction of a vehicle.

Although not shown, end portions of the rack shaft 8 are connected to corresponding steered wheels via corresponding tie-rods and corresponding knuckle arms.

The steering shaft 3 has an upper shaft 11 and a lower shaft 12 which are connected together through spline fitting, for example, so as not only to rotate together but also to move relatively in an axial direction.

The steering shaft 3 is supported rotatably via bearings, now shown, by a steering column 15 which is fixed to vehicle body-side members 13, 14.

The steering column 15 includes a tubular upper jacket 16 (a movable jacket) and a tubular lower jacket 17 which are fitted together so as to move relatively in the axial direction, and a housing 18 which is connected to an axial direction lower end of the lower jacket 17.

A speed reduction mechanism 20 is accommodated in the housing 18, and this speed reduction mechanism 20 decelerates the power of a steering assist electric motor 19 for transmission to the lower shaft 12.

The speed reduction mechanism 20 has a drive gear 21 which is connected so as to rotate together with a rotational shaft (not shown) of the electric motor 19 and a driven gear 22 which meshes with the drive gear 21 and which rotates together with the lower shaft 12.

In this embodiment, the steering device 1 will be described as being applied to an electric power steering device. However, the invention may be applied to a manual steering device.

Additionally, in this embodiment, the steering device 1 will be described as being tiltable. However, the invention may be applied to a steering device which has no tilt adjusting function or may be applied to a steering device which enables both a tilting adjustment and a telescoping adjustment.

Figure 2:
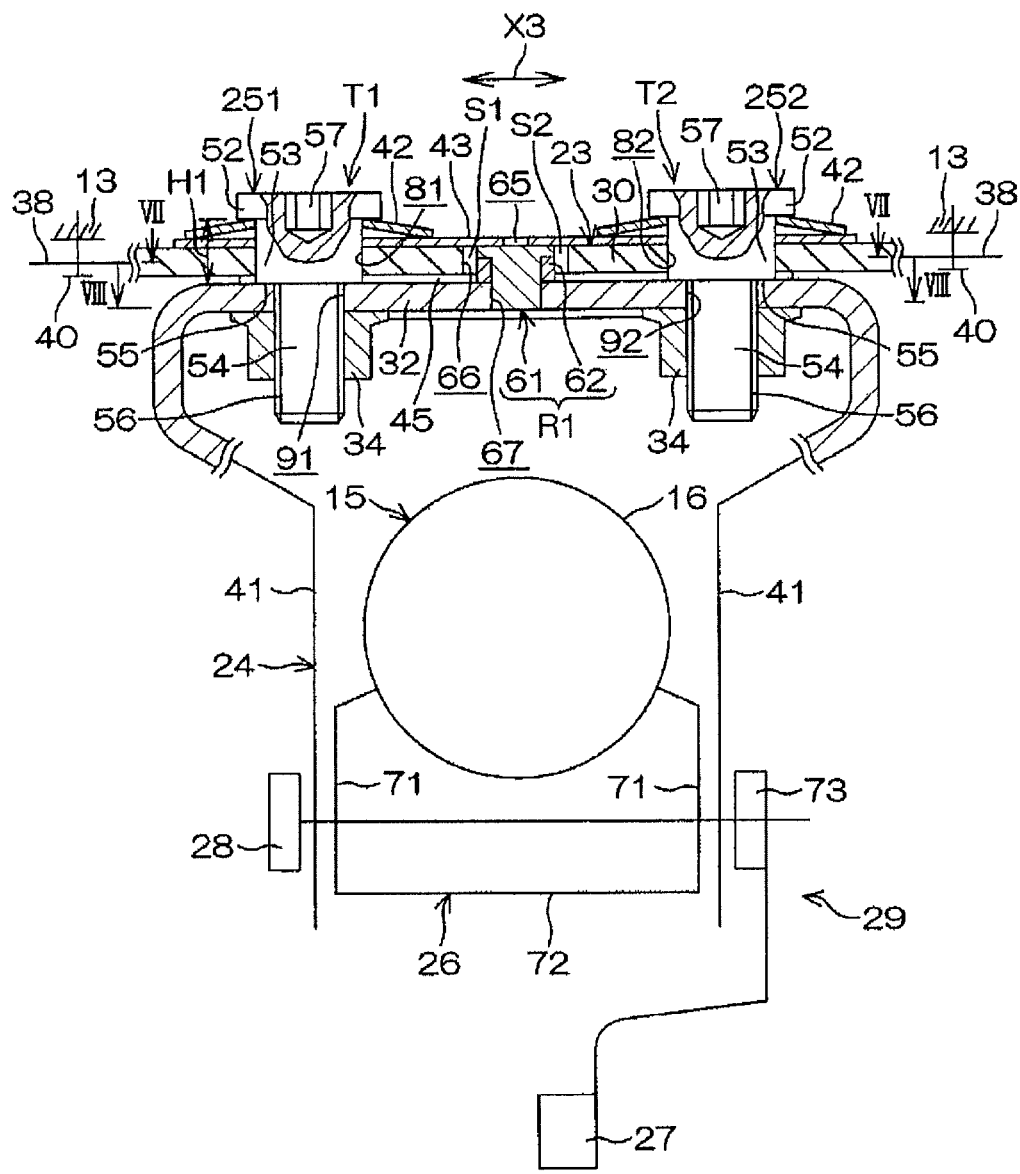
FIG. 2 is a schematic sectional view of the steering device of the first embodiment, which shows a section taken along a line II-II in FIG. 1.

As shown in FIG. 2 which is a schematic sectional view, the steering device 1 includes a first suspending mechanism T1 and a second suspending mechanism T2 which suspend the upper jacket 16 via a tilt bracket 24, which is a movable bracket, by the use of a fixed bracket 23.

Namely, as shown in FIGS. 1 and 2, the tilt bracket 24, which is the movable bracket, is suspended from the fixed bracket 23 which is fixed to the vehicle body-side member 13 via a first suspending bolt 251 which functions as a first suspending shaft of the first suspending mechanism T1 and a second suspending bolt 252 which functions as a second suspending shaft of the second suspending mechanism T2.

On the other hand, a column bracket 26 is fixed to the upper jacket 16 of the steering column 15.

As shown in FIGS. 1 and 2, the steering device 1 includes a lock mechanism 29 which locks or unlocks the position of the column bracket 26 (and hence, the positions of the upper jacket 16 and the steering member 2) after a tilting adjustment via the tilt bracket 24 by means of a fastening shaft 28 moves in response to the operation of an operation lever 27.

Figure 3:
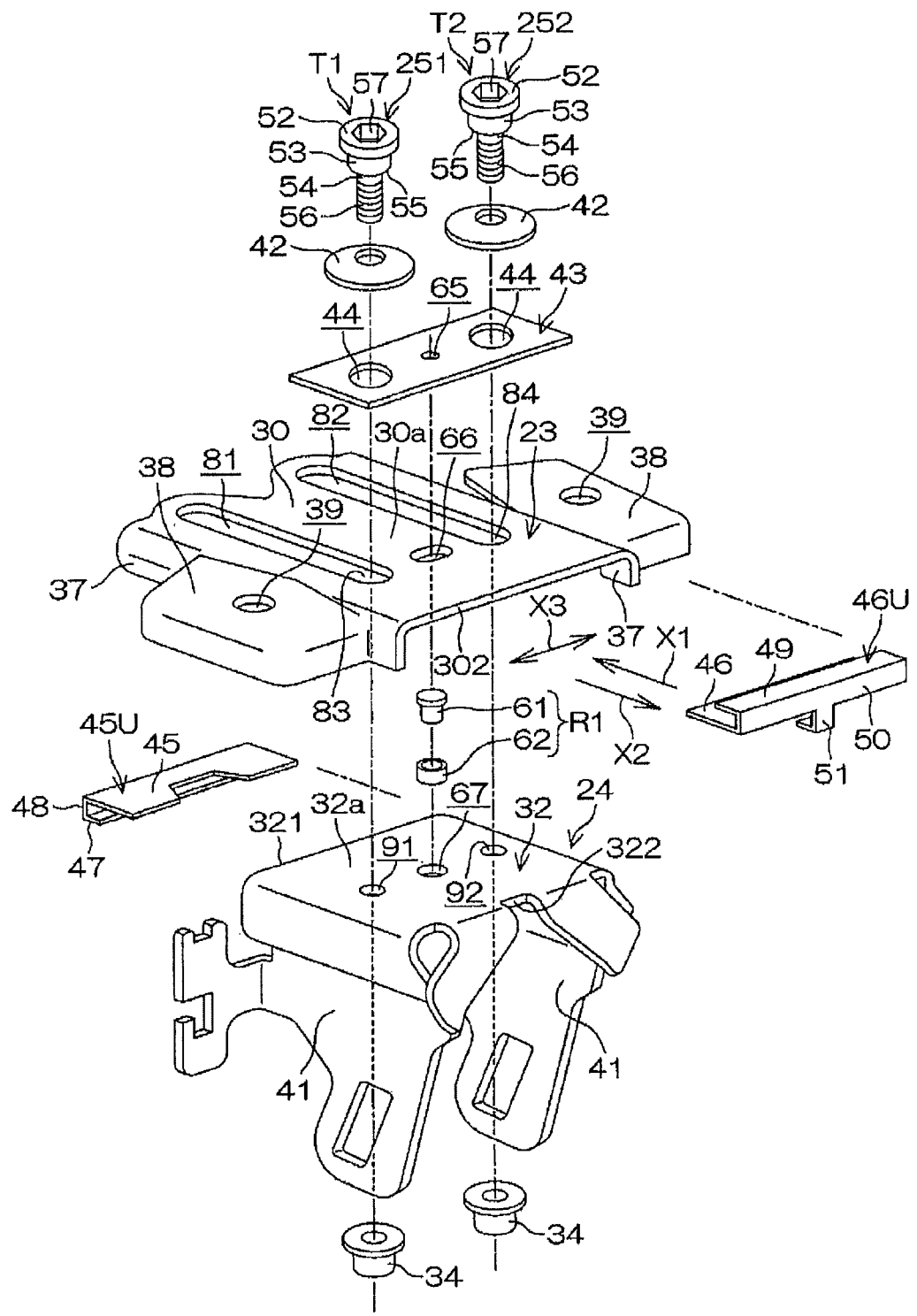
FIG. 3 is an exploded perspective view of the steering device of the first embodiment.

As shown in FIGS. 2, 3, the tilt bracket 24 includes a pair of side plates 41. As shown in FIG. 2, the column bracket 26 has a groove shape including a pair of side plates 71 which face individually the pair of side plates 41 of the tilt bracket 24 and a connecting plate 72 which connects lower ends of the pair of side plates 71 together.

Referring to FIG. 2, the fastening shaft 28 is made up of a bolt which penetrates the side plates 41, 71 of the tilt bracket 24 and the column bracket 26.

By rotating a nut 73 which is screwed on the fastening shaft 28 by rotating the operation lever 27, both the side plates 41, 71 are fastened between a head portion of the bolt as the fastening shaft 28 and the nut 73 to thereby lock both the side plates 41, 71.

This serves to lock the position of the steering member 2 after the tilting adjustment, whereby a tilting lock is attained.

Figure 5:
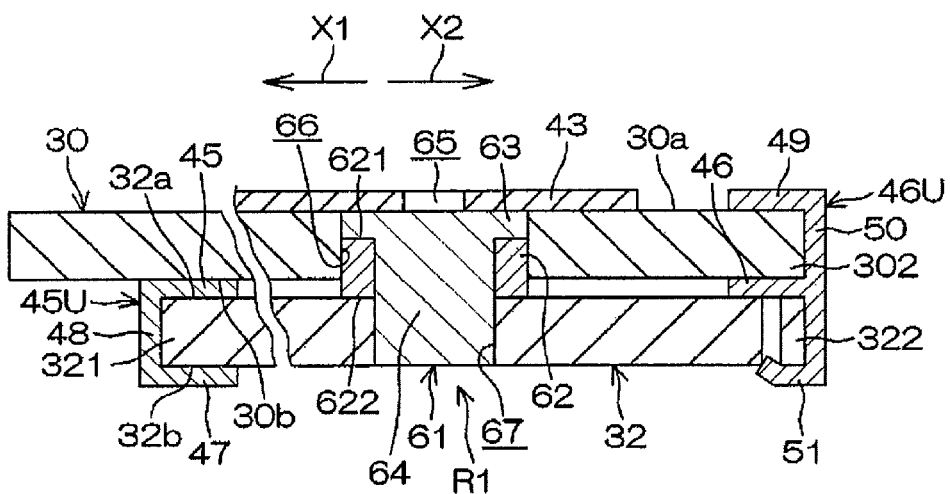
FIG. 5 is a sectional view of a state in which a first plate and a second plate are connected together, which shows a section in a front-to-rear direction including an axis of a resin pin in the first embodiment.
Figure 6:
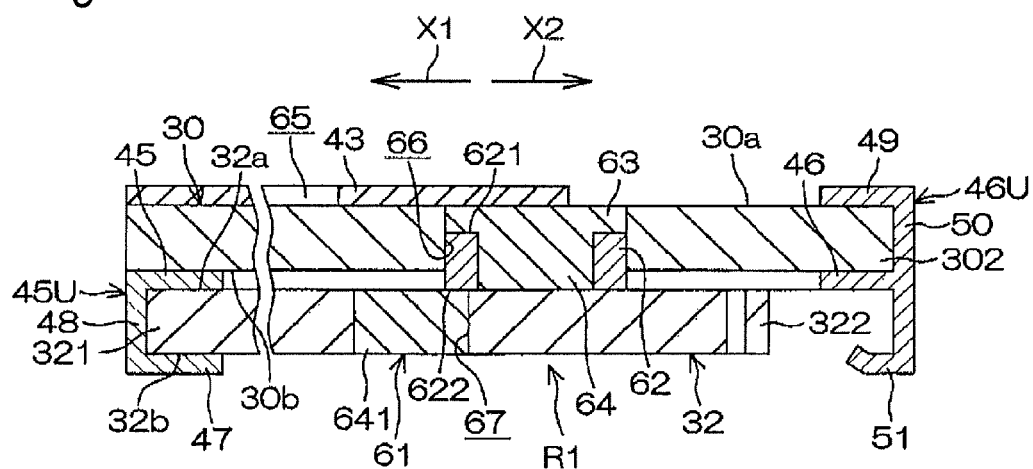
FIG. 6 is a sectional view of the first plate and the second plate at the time of a secondary collision, which shows a state in which the second plate is dislocated from a predetermined position of the first plate in a column moving direction as a result of the shearing of the resin pin in the first embodiment.

In addition, the steering device 1 includes a connecting-disconnecting mechanism R1 which connects a first plate 30 of the fixed bracket 23 and a second plate 32 of the tilt bracket 24 and which dislocates the second plate 32 from a predetermined position (a position shown in FIG. 5) of the first plate 30 towards a first direction X1 which is a column moving direction as shown in FIG. 6 when a secondary collision occurs.

Figure 4:
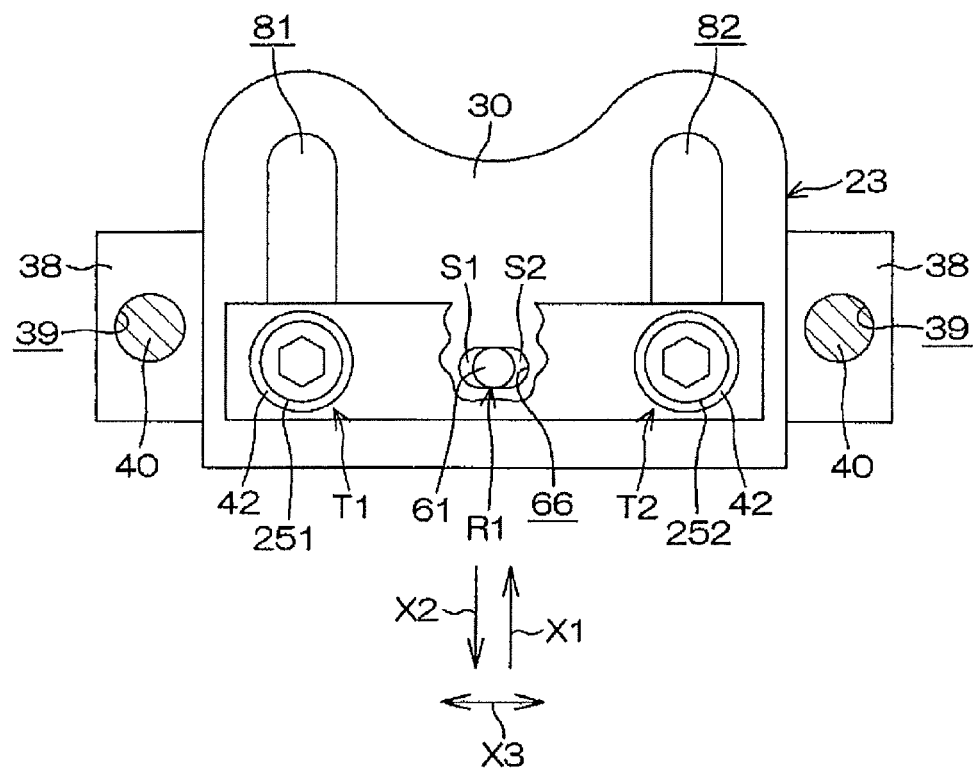
FIG. 4 is a partially broken schematic plan view of a fixed bracket, both suspending mechanisms, and a connecting-disconnecting mechanism of the first embodiment.

As shown in FIG. 2 and FIG. 4 which is a partially broken schematic plan view, the connecting-disconnecting mechanism R1 is disposed between both the suspending mechanisms T1, T2 (that is, between a first elongated slot 81 and a second elongated slot 82, which will be described later, of the first plate 30 of the fixed bracket 23) with respect to a third direction X3 which is orthogonal to the first direction X1.

Specifically speaking, the connecting-disconnecting mechanism R1 is disposed in a central position between the first elongated slot 81 and the second elongated slot 82 (that is, between the first suspending bolt 251 and the second suspending bolt 252) with respect to the third direction X3 which is orthogonal to the first direction X1.

Referring to FIG. 1, the fixed bracket 23 includes the first plate 30 which is parallel to the column moving direction (which is the first direction X1 and which corresponds to an axial direction of the steering shaft 3) when a secondary collision occurs.

The first elongated slot 81 for the first suspending mechanism T1 and the second elongated slot 82 for the second suspending mechanism T2, which are made up of elongated holes which extend parallel to the first direction X1 (the column moving direction), are formed in the first plate 30.

On the other hand, the tilt bracket 24 (the movable bracket) includes the second plate 32 which faces the first plate 30.

A first circular hole 91 for the first suspending mechanism T1 and a second circular hole 92 for the second suspending mechanism T2 are formed in the second plate 32 so as to face portions of the first elongated slot 81 and the second elongated slot 82, respectively, (end portions 83, 84 in a second direction X2 which is an opposite direction to the first direction X1).

The suspending bolts 251, 252 are made up of bolts which pass through the corresponding elongated slots 81, 82 in the first plate 30 and the corresponding circular holes 91, 92 in the second plate 32 to screw into corresponding nuts 34.

The suspending bolts 251, 252 which connect the first plate 30 and the second plate 32 together in cooperation with the nuts 34 suspend the upper jacket 16 (the movable jacket) via the tilt bracket 24 (the movable bracket) and the column bracket 26.

The suspending bolts 251, 252 can move in the column moving direction (the first direction X1) along the corresponding elongated slots 81, 82 together with the tilt bracket 24 (the movable bracket), the column bracket 26 and the upper jacket 16 when a secondary collision occurs.

A lower bracket 35 which is fixed to the vehicle body-side member 14 supports a tilting center shaft 36 which is a pivot shaft.

The tilting center shaft 36 supports the lower jacket 17 via the housing 18 of the steering column 15 so as to oscillate about the tilting center shaft 36.

As shown in FIGS. 2 and 3, the suspending mechanisms T1, T2 are made up of the corresponding suspending bolts 251, 252, plate springs 42 which are made up of coned disc springs, for example, and the nuts 34.

The connecting-disconnecting mechanism R1 is made up of a resin pin 61 which shears when a secondary collision occurs and a cylindrical metallic collar 62 which fits on a portion of an axial direction of the resin pin 61.

A collar of hard resin or ceramic may be used in place of the metallic collar 62.

Referring to FIG. 3, the fixed bracket 23 includes a pair of side plates 37 which are provided so as to extend individually downwards from a pair of side edges of the first plate 30 and a pair of mounting plates 38 which are provided so as to extend individually outwards from the pair of side plates 37.

The fixed bracket 23 is formed of a metallic plate, for example.

The mounting plates 38 are fixed individually to the vehicle body-side member 13 by fixing bolts 40 (refer to FIG. 4) which are inserted through threaded insertion holes 39 (refer to FIGS. 3 and 4) which are provided individually in the mounting plates 38.

This enables the fixed bracket 23 to be fixed to the vehicle body-side member 13.

Referring to FIGS. 2 to 4, in the first plate 30 of the fixed bracket 23, the first elongated slot 81 and the second elongated slot 82 extend parallel to the column moving direction (the first direction X1) when a secondary collision occurs and are separated in the third direction X3 which is orthogonal to the first direction X1.

As shown in FIGS. 2, 3, the tilt bracket 24 (the movable bracket) is formed of a metallic plate, for example.

The tilt bracket 24 has a groove-shape including the second plate 32 and the pair of side plates 41 which are provided so as to extend individually downwards from the pair of side edges of the second plate 32.

Connecting portions between the second plate 32 and the individual side plates 41 may be formed to be curved as shown in FIGS. 2, 3.

In the second plate 32 of the tilt bracket 24, the first circular hole 91 and the second circular hole 92 correspond to the first suspending bolt 251 and the second suspending bolt 252, respectively.

The first suspending bolt 251 and the second suspending bolt 252 pass sequentially through the annular plate springs 42 which are made up of the coned disc springs, for example, corresponding through holes 44 in an interposed plate 43, the corresponding first elongated slot 81 and second elongated slot 82 in the first plate 30 and the corresponding first circular hole 91 and second circular hole 92 in the second plate 32 to thereby be screwed into the corresponding nuts 34.

This enables both the suspending bolts 251, 252 to suspend the tilt bracket 24.

The interposed plate 43 is made up of a long plate which extends in the third direction X3 which is orthogonal to the column moving direction (the first direction X1) as shown in FIGS. 3 and 4 and is interposed between both the plate springs 42 and an upper surface 30a of the first plate 30 as shown in FIG. 2.

At least a surface of a side of the interposed plate 43 which faces the first plate 30 is formed from a low friction material such as a fluorine plastic, for example.

Namely, the whole of the interposed plate 43 may be formed from the low friction material, or the low friction material is coated on the surface of the side of the interposed plate 43 which faces the first plate 30.

A first interposed plate 45 and a second interposed plate 46 are interposed between the first plate 30 and the second plate 32, and the first interposed plate 45 and the second interposed plate 46 work to reduce a sliding resistance generated when the second plate 32 moves in the column moving direction (the first direction X1) relative to the first plate 30 at the time of a secondary collision.

The first interposed plate 45 makes up a groove-shaped unit 45U which is locked at a first end portion 321 which is an end portion of the second plate 32 which is situated to face in the column moving direction (the first direction X1).

Namely, the unit 45U includes the first interposed plate 45 which follows the upper surface 32a of the second plate 32 and a lower surface 30b of the first plate 30, an opposing plate 47 which faces the first interposed plate 45 and follows a lower surface 32b of the second plate 32 and a connecting plate 48 which connects the first interposed plate 45 and the opposing plate 47 together and which is brought into abutment with an end edge of the second plate 32 which is situated to face in the column moving direction X1.

At least a surface of a side of the interposed plate 45 which faces the first plate 30 is formed from a low friction material such as a fluorine plastic, for example.

Namely, the first interposed plate 45 or the unit 45U may be formed of the low friction material, or the low friction material may be coated on the surface of the first interposed plate 45 which faces the first plate 30.

The second interposed plate 46 makes up a unit 46U which is locked at a second end portion 302 which is an end portion of the first plate 30 which is situated to face in the second direction X2 which is the opposite direction to the column moving direction (the first direction X1) and a second end portion 322 which is an end portion of the second plate 32 which is situated to face in the second direction X2 which is the opposite direction to the column moving direction (the first direction X1).

Namely, the unit 46U includes the second interposed plate 46 which follows the upper surface 32a of the second plate 32 and the lower surface 30b of the first plate 30 and an opposing plate 49 which faces the second interposed plate 46 and follows the upper surface 30a of the first plate 30.

The unit 46U includes a connecting plate 50 which connects the second interposed plate 46 and the opposing plate 49 together and which is brought into abutment with an end edge of the first plate 30 which is situated to face in the second direction X2 which is the opposite direction to the column moving direction (the first direction X1) and a locking portion 51 having a hook shape, for example, which is hooked on the second end portion 322 of the second plate 32.

At least a surface of a side of the second interposed plate 46 which faces the second plate 32 is formed from a low friction material such as a fluorine plastic, for example.

Namely, the second interposed plate 46 or the unit 46U may be formed of the low friction material, or the low friction material may be coated on the surface of the second interposed plate 46 which faces the second plate 32.

As shown in FIGS. 2 and 3, the suspending bolts 251, 252 each include a head portion 52, a large diameter portion 53 which continues to the head portion 52 and which is smaller in diameter than the head portion 52, a small diameter portion 54 which continues to the large diameter portion 53 and which is smaller in diameter than the large diameter portion 53, a stepped portion 55 which is formed between the large diameter portion 53 and the small diameter portion 54 and a threaded portion 56 which is provided on the small diameter portion 54.

A tool engagement portion 57 which is formed into a hexagonal hole, for example, is provided on the head portion 52.

As shown in FIG. 2, the large diameter portions 53 pass through the annular plate springs 42, the through holes 44 in the interposed plate 43, and the corresponding elongated slots 81, 82 in the first plate 30.

The stepped portions 55 are in abutment with the upper surface 32a of the second plate 32 and are borne by the upper surface 32a.

The second plate 32 is held between the stepped portions 55 and the nuts 34, whereby the suspending bolts 251, 252 and the second plate 32 are fixed together.

A space H1 between the head portion 52 and the stepped portion 55 (which corresponds to an axial length of the large diameter portion 53) is made greater than a total of a thickness of the first interposed plate 45 (or a thickness of the second interposed plate 46) which is interposed between the first plate 30 and the second plate 32, a thickness of the first plate 30, a thickness of the interposed plate 43 which follows the upper surface 30a of the first plate 30 and a thickness of the plate spring 42 when the plate spring 42 is compressed to a maximum extent.

This allows the plate springs 42 to bias elastically the first plate 30 via the interposed plate 43 towards the second plate 32.

The resin pin 61 of the connecting-disconnecting mechanism R1 includes a head portion 63 having a circular section, for example, and a cylindrical shaft portion 64 which is smaller in diameter than the head portion 63.

The cylindrical metallic collar 62 is fitted on an outer circumference of the shaft portion 64.

An outside diameter of the metallic collar 62 is equal to an outside diameter of the head portion 63 of the resin pin 61.

First end portion 621 of an axial direction of the metallic collar 62 is brought into abutment with the head portion 63 of the resin pin 61, and an axial direction second end portion 622 of the metallic collar 62 is borne by the upper surface 32a of the second plate 32.

This prevents the resin pin 61 and the metallic collar 62 from falling from the second plate 32.

On the other hand, the interposed plate 43 is disposed so as to cover the head portion 63 of the resin pin 61 from thereabove, whereby the resin pin 61 is prevented from being dislocated upwards.

Additionally, an inspection hole 65, which is smaller in bore diameter than an outside diameter of the head portion 63, is formed in the interposed plate 43 so as to face the head portion 63 of the resin pin 61.

It is possible to determine easily on such a working failure as failing to assemble the resin pin 61 by visualizing the head portion 63 of the resin pin 61 through the inspection hole 65 in the interposed plate 43.

The head portion 63 of the resin pin 61 and most of the metallic collar 62 are inserted into a first hole 66 (a resin pin insertion hole) which is formed in the first plate 30 of the fixed bracket 23 for the connecting-disconnecting mechanism R1.

Part of the metallic collar 62 projects from the first hole 66.

A portion of the shaft portion 64 of the resin pin 61 which projects from the metallic collar 62 is inserted into a second hole 67 which is formed in the second plate 32 of the tilt bracket 24 (the movable bracket) for the connecting-disconnecting mechanism R1.

Figure 7:
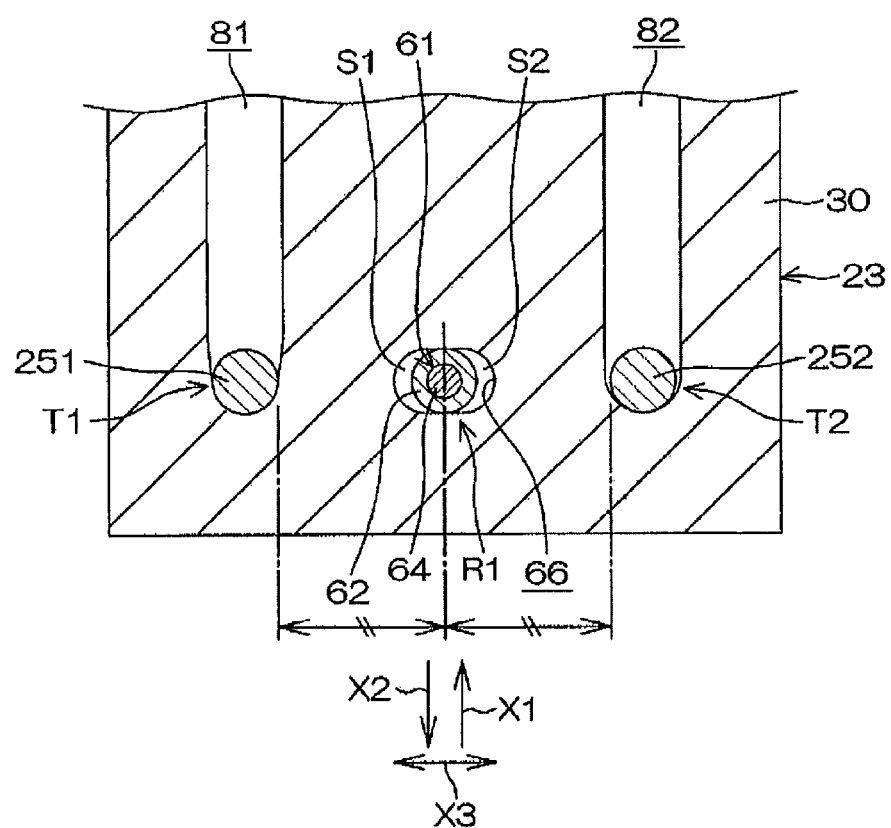
FIG. 7 is a sectional view taken along a line VII-VII in FIG. 2, which shows sections of the first plate, both suspending bolts and the connecting-disconnecting mechanism in the first embodiment.

As shown in FIG. 7 which is a sectional view taken along a line VII-VII in FIG. 2, the first hole 66 formed in the first plate 30 for the connecting-disconnecting mechanism R1 is disposed in a central position between both the elongated slots 81, 82 for both the suspending mechanisms T1, T2 with respect to a direction Y1 which is orthogonal to the column moving direction X1. Namely, the resin pin 61 is disposed in a central position between both the suspending bolts 251, 252 with respect to the third direction X3 which is orthogonal to the column moving direction (the first direction X1).

The first hole 66 formed in the first plate 30 for the connecting-disconnecting mechanism R1 is formed into a horizontally elongated hole which is long in the third direction X3 which is orthogonal to the column moving direction (the first direction X1).

This provides gaps S1, S2 between an outer circumference of the metallic collar 62 and an inner circumference of the first hole 66 with respect to the third direction X3 which is orthogonal to the column moving direction (the first direction X1).

Figure 8:
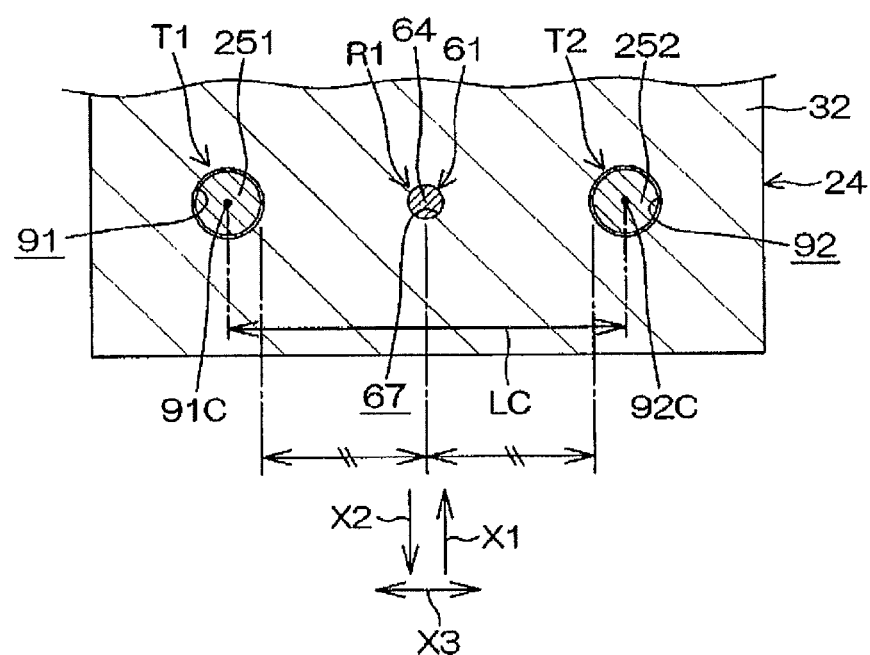
FIG. 8 is a sectional view taken along a line VIII-VIII in FIG. 2, which shows sections of the second plate, both the suspending bolts and the connecting-disconnecting mechanism in the first embodiment.

As shown in FIG. 8 which is a sectional view taken along a line VIII-VIII in FIG. 2, the second hole 67 formed in the second plate 32 of the tilt bracket 24 for the connecting-disconnecting mechanism R1 is disposed in a central position between both the circular holes 91, 92 which are formed for both the suspending mechanisms T1, T2, respectively, with respect to the third direction X3 which is orthogonal to the column moving direction (the first direction X1).

The second hole 67 is formed by a circular hole having a bore diameter which is equal to or slightly greater than an outside diameter of the shaft portion 64 of the resin pin 61.

When a secondary collision occurs, mating surfaces of the second end portion 622 of the metallic collar 62 and the second plate 32 deflect, whereby the shaft portion 64 of the resin pin 61 is sheared.

A shearing blade which is made up of an inner circumferential edge of the second end portion 622 of the metallic collar 62 has an ark-like shape, and a shearing blade which is made up of an edge portion of the second hole 67 in the second plate 32 also has an arc-like shape.

The first circular hole 91 and the second circular hole 92 which are formed in the second plate 32 are disposed in the same position with respect to the first direction X1 which is the column moving direction.

Consequently, the first suspending bolt 251 and the second suspending bolt 252 which are restricted in position by the first circular hole 91 and the second circular hole 92, respectively, are disposed in the same position with respect to the first direction X1.

Figure 9:
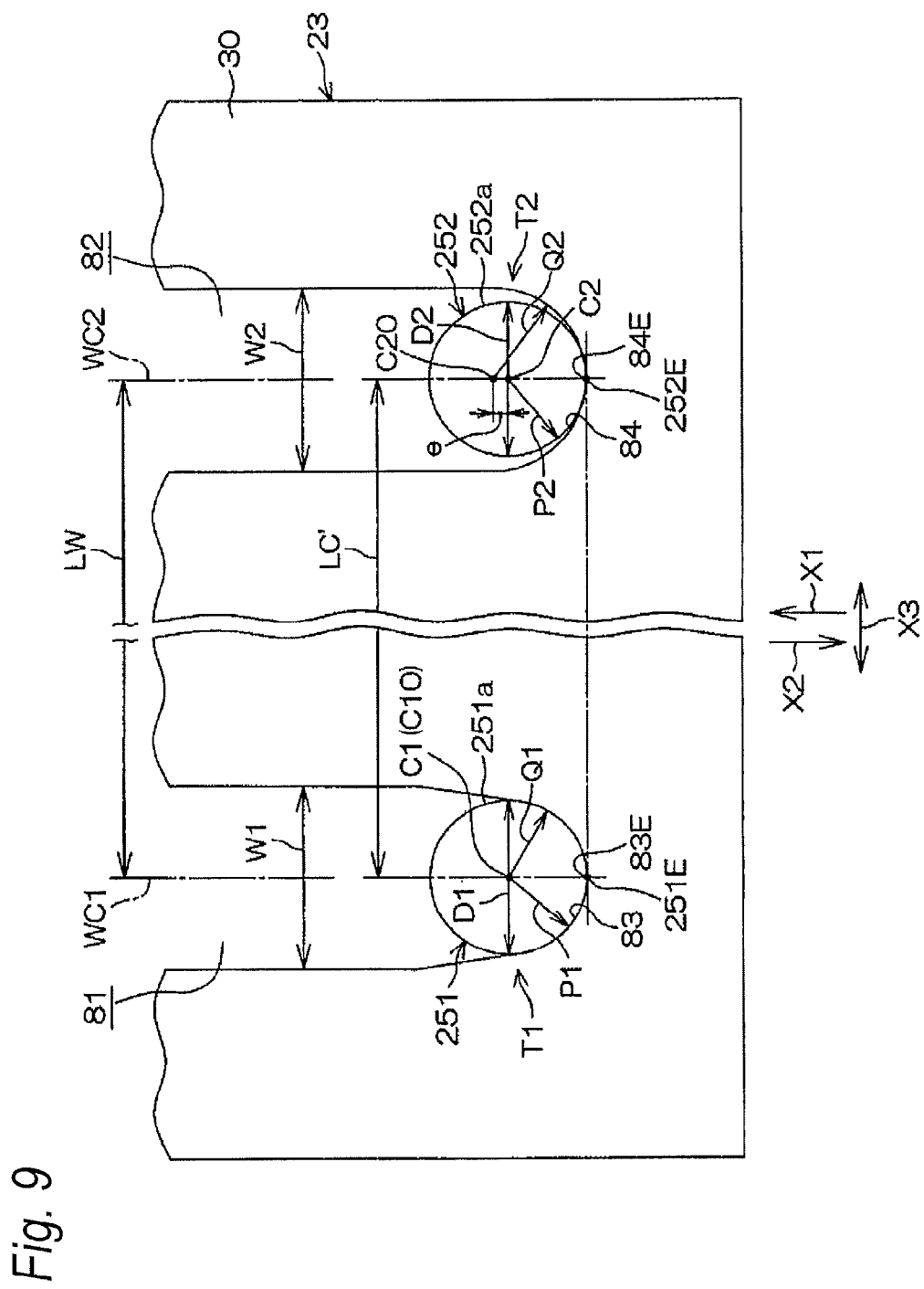
FIG. 9 is an enlarged schematic view of a portion in FIG. 7 showing both elongated slots in the first plate and both the suspending bolts.

Referring to FIG. 9 which shows schematically a relationship between both the slots and both the suspending bolts by enlarging part of FIG. 7, with respect to the third direction X3 which is orthogonal to the first direction X1 (the column moving direction), a slot width W1 of the first elongated slot 81 and a slot width W2 of the second elongated slot 82 are equal to each other (W1=W2) or substantially equal to each other (W1≈W2).

In the case of the latter, the slot width W1 may be greater or smaller than the slot width W2.

A diameter D1 of the first suspending bolt 251 and a diameter D2 of the second suspending bolt 252 are equal to each other (D1=D2).

Additionally, the respective slot widths W1, W2 of the elongated slots 81, 82 are greater than the respective diameters D1, D2 of the suspending bolts 251, 252 (W1>D1=D2, W2>D1=D2).

In FIG. 8, a distance LC with respect to the third direction X3 between centers 91C, 92C of the first circular hole 91 and the second circular hole 92 is equal to a distance LW with respect to the third direction X3 between slot width centers WC1, WC2 of the first elongated slot 81 and the second elongated slot 82 (LW=LC).

Consequently, a distance LC' between centers C1, C2 of the first suspending bolt 251 and the second suspending bolt 252 which are restricted in position by the first circular hole 91 and the second circular hole 92, respectively, is generally equal to the distance LW with respect to the third direction X3 between the slot width centers WC1, WC2 of the first elongated slot 81 and the second elongated slot 82 (LW≈LC').

The first suspending bolt 251 passes through an end portion 83 of the first elongated slot 81 in the second direction X2 which is the opposite direction to the first direction X1.

The second suspending bolt 252 passes through an end portion 84 of the second elongated slot 82 in the second direction X2.

The position with respect to the second direction X2 of a portion 83E of the end portion 83 of the first elongated slot 81 in the second direction X2 which is situated farthest in the second direction X2 is equal to the position with respect to the second direction X2 of a portion 84E of the end portion 84 of the second elongated slot 82 in the second direction X2 which is situated farthest in the second direction X2.

An inner surface of the end portion 83 of the first elongated slot 81 in the second direction X2 is formed into a cylindrical surface which is concentric with and identical in diameter to the first suspending bolt 251 and is in contact with a predetermined area which includes a portion 251E of an outer circumference 251a of the first suspending bolt 251 which is situated farthest in the second direction X2 (for example, a semicircle lying to face in the second direction X2). Namely, the center C1 of the first suspending bolt 251 coincides with a center C10 of the cylindrical surface which is formed by the inner circumference of the end portion 83 of the first elongated slot 81 in the second direction X2, and a radius P1 of the first suspending bolt 251 is equal to a radius Q1 of the cylindrical surface which is formed by the inner circumference of the end portion 83 of the first elongated slot 81 in the second direction X2.

This allows a position of the first suspending bolt 251 in relation to the second direction X2 and a position of the first suspending bolt 251 in relation to the third direction X3 are restricted by the cylindrical surface which is formed by the inner circumference of the end portion 83 of the first elongated slot 81 in the second direction X2.

On the other hand, an inner surface of the end portion 84 of the second elongated slot 82 in the second direction X2 is in contact with only the portion 252E of the outer circumference 252a of the second suspending bolt 252 which is situated farthest in the second direction X2.

This allows the inner surface of the end portion 84 of the second elongated slot 82 in the second direction X2 to restrict only a position of the second suspending bolt 252 in relation to the second direction X2.

Specifically, the inner surface of the end portion 84 of the second elongated slot 82 in the second direction X2 is formed into a cylindrical surface which has a center C20 which is offset by an offset amount e in the first direction X1 relative to the center C2 of the second suspending bolt 252 and which has a radius Q2 which is greater than a radius P2 of the second suspending bolt 252.

In addition, the radius Q2 of the cylindrical surface formed by the inner surface of the end portion 84 of the second elongated slot 82 in the second direction X2 is equal to half the slot width W2 of the second elongated slot 82 with respect to the third direction X3 (Q2=W2/2).

Namely, the offset amount e in the first direction X1 between the center C20 of the cylindrical surface which is formed by the inner surface of the end portion 84 of the second elongated slot 82 in the second direction X2 and the center C2 of the second suspending bolt 252 corresponds to a difference (Q2−P2) between the radius Q2 of the cylindrical surface formed by the inner surface of the end portion 84 of the second elongated slot 82 in the second direction X2 and the radius P2 of the second suspending bolt 252 (e=Q2−P2).

According to the embodiment, the predetermined area of the outer circumference 251a of the first suspending bolt 251 is in contact with the cylindrical surface (the cylindrical surface which is concentric with and is identical in diameter to the first suspending bolt 251) which is formed by the end portion 83 of the first elongated slot 81 in the second direction X2, whereby the first suspending bolt 251 is positioned in relation to the two directions (the second direction X2 and the third direction X3) which are orthogonal to each other.

In addition, the second suspending bolt 252 which is positioned only in relation to the second direction X2 by the inner surface of the end portion 84 of the second elongated slot 82 in the second direction X2 has a degree of freedom in the third direction X3. Therefore, both the suspending bolts 251, 252 can easily be mounted based on the first elongated slot 81.

Moreover, the portions 83E, 84E of the end portions 83, 84 of both the elongated slots 81, 82 in the second direction X2 which are situated farthest in the second direction X2 are positioned equally with respect to the second direction X2. Therefore, the positions of both the suspending bolts 251, 252 can be aligned in the first direction X1 (the column moving direction) before a secondary collision occurs.

Consequently, when a second collision occurs, both the suspending bolts 251, 252 moves straight together with the tilt bracket 24 (the movable bracket) and the upper jacket 16 (the movable jacket) in the column moving direction (the first direction X1 or corresponding to a direction in which the elongated slots extend). Therefore, it is possible to suppress the generation of prying in the tilt bracket 24 (the movable bracket) or the upper jacket 16 (the movable jacket).

Additionally, the second suspending bolt 252 can easily be positioned only in relation to the second direction X2 by the inner surface of the end portion 84 of the second elongated slot 82 in the second direction X2 which is formed into the cylindrical surface which has the center C20 which is offset in the first direction X1 relative to the center C2 of the second suspending bolt 252 and which has the radius Q2 which is greater than the radius P2 of the second suspending bolt 252.

Additionally, the radius Q2 of the cylindrical surface which is formed by the inner surface of the end portion 84 of the second elongated slot 82 in the second direction X2 is equal to half the slot width W2 of the second elongated slot 252 with respect to the third direction X3 (that is, Q2=W2/2), and therefore, the end portion 84 of the second elongated slot 82 in the second direction X2 can be formed with good accuracy.

In addition, the distance LC with respect to the third direction X3 between the centers 91C, 92C of the first circular hole 91 and the second circular hole 92 (which generally coincides with the distance LC' between the centers C1, C2 of the first suspending bolt 251 and the second suspending bolt 252) is equal to the distance LW with respect to the third direction X3 between the slot width centers WC1, WC2 of the first elongated slot 81 and the second elongated slot 82 (LW=LC). Therefore, the advantages described above can be attained in an ensured fashion.

As shown in FIG. 7, the first hole 66 which is the resin pin insertion hole and the resin pin 61 can move relatively the predetermined amount with respect to the third direction X3 which is orthogonal to the column moving direction (the first direction X1).

Specifically, the gaps S1, S2 are provided between the outer circumference of the metallic collar 62 which is fitted on the outer circumference of the resin pin 61 and the inner circumference of the first hole 66 with respect to the third direction X3 which is orthogonal to the column moving direction (the first direction X1).

Because of this, with respect to the third direction X3 which is orthogonal to the column moving direction (the first direction X1), a play amount between the resin pin 61 and the first hole 66 (corresponding to a play amount between the metallic collar 62 and the first hole 66 in this embodiment) is greater than a play amount between the suspending bolts 251, 252 and the corresponding end portions 83, 84 of the elongated slots 81, 82 in the second direction X2 (which is substantially zero in this embodiment).

Namely, the positioning of the fixed bracket 23 and the tilt bracket 24 (the movable bracket) in the horizontally lateral direction (the third direction X3 which is orthogonal to the first direction X1 which is the column moving direction) is executed by both the elongated slots 81, 82 in the first plate 30, both the circular holes 91, 92 in the second plate 32 and both the suspending bolts 251, 252.

The resin pin 61 does not contribute to the positioning in the horizontally lateral direction.

Consequently, when the steering device 1 is transported which is not assembled to the vehicle or when the steering device 1 is assembled to the vehicle, even though a horizontally lateral impact is exerted on the steering device 1 by some external force which acts in the horizontally lateral direction, there is no such situation that the resin pin 61 directly receives the force to shear abruptly, resulting in a failure.

In addition, as shown in FIG. 8, the second hole 67 through which the resin pin 61 is inserted has an arc-shaped cross section in an opposite area to the column moving direction (the first direction X1) (specifically, the whole cross section of the second hole 67 is not circular).

Consequently, when a secondary collision occurs, the resin pin 61 shears smoothly without collapsing (so-called falling) in the column moving direction (the first direction X1).

Consequently, it is possible to obtain a stable impact absorbing load.

Next, FIG. 10 shows schematically a relationship between both slots and both suspending bolts in a second embodiment of the invention.

The second embodiment shown in FIG. 10 differs mainly from the first embodiment shown in FIG. 9 in that an inner surface of an end portion 184 of a second elongated slot 182 in a second direction X2 is formed into a flat surface which extends along a third direction X3.

The flat surface formed by the inner surface of the end portion 184 of the second elongated slot 182 in the second direction X2 is in contact with only a portion 252E on an outer circumference 252a of a second suspending bolt 252 which is situated farthest in the second direction X2.

This allows the inner surface of the end portion 184 of the second elongated slot 182 in the second direction X2 to restrict only a position of the second suspending bolt 252 in relation to the second direction X2.

The position of a portion 83E of an end portion 83 of a first elongated slot 81 in the second direction X2 which is situated farthest in the second direction X2 is equal to the position of a portion 184E of the end portion 184 of the second elongated slot 182 in the second direction X2 which is situated farthest in the second direction X2 (which corresponds to the whole of the end portion 184 in the second embodiment).

Like reference numerals to those given to the constituent elements of the first embodiment shown in FIG. 9 are given to like constituent elements of the second embodiment shown in FIG. 10 to those of the first embodiment shown in FIG. 9.

In the second embodiment, too, the same working effect as that of the first embodiment can be provided.

Further, the second suspending bolt 252 can easily be positioned only in relation to the second direction X2 by the inner surface of the end portion 184 of the second elongated slot 182 in the second direction X2 which is formed into the flat surface which extends along the third direction X3.

The invention is not limited to the embodiments that have been described heretofore. For example, in the first embodiment shown in FIG. 9, the inner surface of the end portion of the second elongated slot in the second direction may be formed into a concavely curved surface having a radius of curvature which is greater than the radius of the second suspending bolt in place of the cylindrical surface.

In addition to that described above, various alterations or modifications can be made without departing from the scope of claims of the invention.

REFERENCE SIGNS LIST 1 steering device
2 steering member
3 steering shaft
13 vehicle body-side member
15 steering column
16 upper jacket (movable jacket)
23 fixed bracket
24 tilt bracket (movable bracket)
251 first suspending bolt (first suspending shaft)
251a outer circumference
251E portion situated farthest in first direction
252 second suspending bolt (second suspending shaft)
252a outer circumference
252E portion situated farthest in second direction
26 column bracket
30 first plate
32 second plate 81 first elongated slot
82, 182 second elongated slot
83 end portion (of first elongated slot in second direction)
84, 184 end portion (of second elongated slot in second direction)
83E portion situated farthest in second direction
84E, 184E portion situated farthest in second direction
91 first circular hole
92 second circular hole
91C center (of first circular hole)
92C center (of second circular hole)
C1 center (of first suspending shaft)
C2 center (of second suspending shaft)
C10 center (of cylindrical surface formed by end portion of first elongated slot in second direction)
C20 center (of cylindrical surface formed by end portion of second elongated slot in second direction)
D1 diameter (of first suspending shaft)
D2 diameter (of second suspending shaft)
LC distance between centers (of first circular hole and second circular hole)
LC' distance between centers (of first suspending shaft and second suspending shaft)
LW distance between slot width centers (of first elongated slot and second elongated slot)
P1 radius (of first suspending shaft)
P2 radius (of second suspending shaft)
Q1 radius (of cylindrical surface formed by end portion of first elongated slot in second direction)
Q2 radius (of cylindrical surface formed by end portion of second elongated slot in second direction)
R1 connecting-disconnecting mechanism
T1, T2 suspending mechanism
W1 slot width (of first elongated slot)
W2 slot width (of second elongated slot)
WC1 slot width center (of first elongated slot)
WC2 slot width center (of second elongated slot)
X1 first direction (column moving direction)
X2 second direction (opposite direction to first direction)
X3 third direction (direction which is orthogonal to first direction)

The invention claimed is:

1. A steering device comprising:
a fixed bracket which includes a first plate which is fixed to a vehicle body-side member;
a movable jacket which rotatably supports a steering shaft having a steering member connected to one end of the steering shaft;
a movable bracket which supports the movable jacket so as to move in a first direction which is a column moving direction when a secondary collision occurs and which includes a second plate facing the first plate; and
a first suspending mechanism and a second suspending mechanism which move together in the first direction when the secondary collision occurs,
wherein a first elongated slot and a second elongated slot are provided in the first plate so as to extend parallel to the first direction,
wherein a first circular hole which corresponds to the first elongated slot and a second circular hole which corresponds to the second elongated slot are provided in the second plate,
wherein the first suspending mechanism has a first suspending shaft which suspends the movable jacket via the movable bracket by passing through the first elongated slot and the first circular hole to connect the first plate and the second plate together,
wherein the second suspending mechanism has a second suspending shaft which suspends the movable jacket via the movable bracket by passing through the second elongated slot and the second circular hole to connect the first plate and the second plate together,
wherein the first circular hole and the second circular hole are disposed in the same position with respect to the first direction,
wherein the first suspending shaft passes through an end portion of the first elongated slot in a second direction which is an opposite direction to the first direction,
wherein the second suspending shaft passes through an end portion of the second elongated slot in the second direction,
wherein slot widths of the first elongated slot and the second elongated slot with respect to a third direction which is orthogonal to the first direction are greater than diameters of the first suspending shaft and the second suspending shaft,
wherein an inner surface of the end portion of the first elongated slot in the second direction is formed into a cylindrical surface which is concentric with and is identical in diameter to the first suspending shaft so as to be in contact with a predetermined area of an outer circumference of the first suspending shaft to thereby restrict a position of the first suspending shaft in relation to the second direction and a position of the first suspending shaft in relation to the third direction,
wherein an inner surface of the end portion of the second elongated slot in the second direction is brought into contact with only a portion of an outer circumference of the second suspending shaft which is situated farthest in the second direction to thereby restrict only a position of the second suspending shaft in the second direction, and
wherein a position with respect to the second direction of a portion of the end portion of the first elongated slot in the second direction which is situated farthest in the second direction is equal to a position with respect to the second direction of a portion of the end portion of the second elongated slot in the second direction which is situated farthest in the second direction.

2. The steering device according to claim 1, wherein the inner surface of the end portion of the second elongated slot in the second direction is formed into a cylindrical surface which has a center being offset in the first direction with respect to a center of the second suspending shaft and which has a radius greater than a radius of the second suspending shaft.

3. The steering device according to claim 2, wherein the radius of the cylindrical surface formed by the inner surface of the end portion of the second elongated slot in the second direction is equal to half the slot width of the second elongated slot in the third direction.

4. The steering device according to claim 1, wherein the inner surface of the end portion of the second elongated slot in the second direction is formed into a flat surface which extends along the third direction.

5. The steering device according to claim 1, wherein a distance with respect to the third direction between a center of the first circular hole and a center of the second circular hole is equal to a distance between a center of the slot width of the first elongated slot with respect to the third direction and a center of the slot width of the second elongated slot with respect to the third direction.

* * * * *